United States Patent [19]

Takeuchi et al.

[11] Patent Number: 4,542,202

[45] Date of Patent: Sep. 17, 1985

[54] LATENT CURING AGENTS FOR EPOXY RESINS

[75] Inventors: Koji Takeuchi, Yokohama; Masahiro Abe, Kawasaki; Nobuo Ito, Oisomachi; Kiyomiki Hirai, Kawasaki, all of Japan

[73] Assignee: Ajinomoto Co., Inc., Tokyo, Japan

[21] Appl. No.: 532,901

[22] Filed: Sep. 16, 1983

[30] Foreign Application Priority Data

Sep. 21, 1982 [JP] Japan .................................. 57-164557
Jun. 22, 1983 [JP] Japan .................................. 58-112232

[51] Int. Cl.$^4$ ...................... C08G 59/52; C08G 59/64; C08G 59/66
[52] U.S. Cl. ...................................... 528/96; 525/504; 528/99; 528/100; 528/103; 528/109; 528/111; 528/119; 528/365; 528/374; 544/87; 544/147; 546/261; 546/262; 546/268; 548/336; 549/551; 549/553; 564/151; 564/325; 564/501; 564/504
[58] Field of Search .................. 528/100, 99, 103, 96, 528/109, 111, 114, 119, 361, 365, 310, 374, 407; 549/551, 553; 525/504; 544/87, 147; 546/261, 268, 262; 548/336; 560/50, 155; 564/151, 501, 504, 325

[56] References Cited

U.S. PATENT DOCUMENTS

| | | | |
|---|---|---|---|
| 3,419,525 | 12/1968 | Aelony | 528/114 X |
| 4,119,609 | 10/1978 | Allen et al. | 528/114 X |
| 4,130,510 | 12/1978 | Tanaka et al. | 528/114 X |
| 4,268,656 | 5/1981 | Ray-Chaudhuri et al. | 528/111 X |
| 4,446,257 | 5/1984 | Kooijmans et al. | 523/404 X |

*Primary Examiner*—Earl A. Nielsen
*Attorney, Agent, or Firm*—Oblon, Fisher, Spivak, McClelland & Maier

[57] ABSTRACT

An addition product obtained by reacting (a) a polyfunctional epoxy compound and (b) a compound having at least one functional group of OH group, SH group, COOH group and CONHNH$_2$ group together with a tertiary amino group in the molecule, and an addition product obtained (a), (b) and (c) an organic compound having two or more active hydrogen atoms in the molecule (excluding a compound having an epoxy group or tertiary amino group) are good curing agents for epxoy resin. The curing agents are useful in formulating novel storable one-package, heat-curable epoxy resin-based compositions.

16 Claims, No Drawings

LATENT CURING AGENTS FOR EPOXY RESINS

The present invention relates to a latent curing agent for epoxy resins. More particularly, it relates to a latent curing agent for epoxy resins which causes rapid curing at moderate elevated temperature and which gives epoxy resin composition having excellent storage stability at room temperature.

One-pack type epoxy resins are preferable to the conventional two-pack type ones because the former are free of misformulation and can be used continuously. One-pack type epoxy resins require a so-called latent curing agent which does not react with epoxy compounds at room temperature but, on heating, reacts with epoxy compounds to effect curing.

Heretofore, several latent curing agents have been proposed. Representative examples are boron trifluoride-amine adduct, dicyandiamide, and dibasic acid dihydrazide. The first one is hard to treat owing to its high hygroscopic property and it affects adversely upon the physical properties of the cured resin. The latter two are useful in formulating epoxy resin compositions having excellent storage stability but full curing by means of these compound could be achieved by heating at higher temperature than 150° C. for a long time. In the case where an epoxy resin is used for sealing electronic components, rapid curing at a low temperature is required not to damage electronic components.

It is known that an amine type curing agent can be improved in workability by converting it into an adduct with an epoxy resin. It has recently been discloed that an adduct obtained by the reaction of the secondary amino group of imidazole compounds or N-methylpiperazine with an epoxy group is a comparatively good latent curing agent. (See U.S. Pat. Nos. 4,066,625 and 4,268,656.) It is known that an adduct is produced by reacting the $-NH_2$ group or $-NH$ group with an epoxy compound as mentioned above. However, it is not known that a curing agent for epoxy resins is produced by reacting a compound having active hydrogen other than amino groups with an epoxy compound.

We have carried out a series of researches in order to develop a latent curing agent which performs curing at a low temperature and is superior in storage stability. As the result, it has been found that it is possible to obtain a latent curing agent which is equal to or superior to the above-mentioned adduct of an amine type curing agent and an epoxy compound. Such a latent curing agent is an adduct obtained by reacting a compound having active hydrogen other than amino group with an epoxy compound. It is important that the compound having active hydrogen should also have a tertiary amino group in the molecule.

That is, it has been found that an addition product obtained by reacting (a) a polyfunctional epoxy compound and (b) a compound having at least one functional group of OH group, SH group, COOH group and $CONHNH_2$ group, and a tertiary amino group in the molecule, or an addition product obtained by reacting (a), (b), and (c) an organic compound having two or more active hydrogen atoms in the molecule (excluding a compound having an epoxy group or tertiary amino group) is the latent curing agent that meets the object of this invention. The present invention was completed based on this finding. The one produced from three components (a), (b), and (c) is superior in storage stability to the one produced from two components (a) and (b).

A detailed description will be given in the following with respect to the latent curing agent of this invention.

The polyfunctional epoxy compound as a raw material of the latent curing agent of this invention may be any compound having two or more epoxy groups in the molecule. It includes, for example, polyglycidyl ether obtained by reacting a polyhydric phenol (such as bisphenol A, bisphenol F, catechol, resorcinol) or a polyhydric alcohol (such as glycerin and polyethylene glycol) with epichlorohydrin; glycidyl ether ester obtained by reacting a hydroxycarboxylic acid (such as p-hydroxybenzoic acid and β-hydroxynaphthoic acid) with epichlorohydrin; polyglycidyl ester obtained from a polycarboxylic acid such as terephthalic acid; glycidylamine compounds obtained from 4,4'-diaminodiphenylmethane and m-aminophenol; and epoxidized novolak and epoxidized polyolefin.

The compound having at least one functional group of OH group, SH group, COOH group and $CONHNH_2$ group together with a tertiary amino group in the molecule, which is reacted with the above-mentioned polyfunctional epoxy compound, may be represented by the following formula.

(1)

where X is $-OH$ group, $-SH$ group, $-COOH$ group, or $-CONHNH_2$ group; $R_1$ and $R_2$ are $C_{1-20}$ alkyl groups, $C_{2-20}$ alkenyl groups, and aralkyl groups such as benzyl group, with or without substituent such as oxygen, halogen, and functional group as represented by X mentioned above; and $R_3$ is a divalent residue of $R_1$ or $R_2$. $R_1$ and $R_2$ may connect with each other to form a ring, or $R_1$, $R_2$, and $R_3$ may connect with one another to form a ring. The compounds with tertiary amino groups contained in the heterocyclic ring as represented by the following formulas (2) and (3) are also effective.

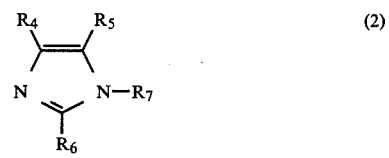

(2)

where $R_4$, $R_5$, and $R_6$ are hydrogen atoms, phenyl groups the groups defined by $R_1$ and $R_2$ where $R_4$, $R_5$, and $R_6$ are the groups defined by $R_1$ and $R_2$ or the functional groups defined by X in the above; $R_7$ is the same as $R_1$ or $R_2$; and at least one of $R_4$, $R_5$, $R_6$, and $R_7$ contains the functional group represented by X.

(3)

where $R_8$ is the functional group represented by X, or the same group as $R_1$ or $R_2$ that contains a functional group represented by X.

The representative examples of the compound having at least one functional group of $-OH$, $-SH$, $-COOH$ and —CONHNH$_2$ together with a tertiary amino group are listed below.

2-Dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl)phenol, 2,4,6-tris(dimethylaminomethyl)phenol, N-β-hydroxyethylmorpholine, 2-dimethylaminoethanethiol, 2-mercaptopyridine, 4-mercaptopyridine, N,N-dimethylaminobenzoic acid, N,N-dimethylglycine, N$^\alpha$,N$^\alpha$-dimethyl-N$^\epsilon$-lauroyllysine, nicotinic acid, isonicotinic acid, picolinic acid, N,N-dimethylglycinehydrazide, N,N-dimethylpropionic acid hydrazide, nicotinic acid hydrazide, isonicotinic acid hydrazide and the like.

The active hydrogen in the organic compound having two or more active hydrogen atoms but having no epoxy group and/or tertiary amino group denotes any hydrogen atom connected to oxygen, nitrogen, sulfur, etc. excluding carbon, or hydrogen atoms contained in a functional group such as —OH, —NH, —NH$_2$, —SH, —COOH, and —CONHNH$_2$.

The examples of the organic compound having two or more active hydrogen atoms but having no epoxy group and/or tertiary amino group are listed below.

Polyhydric phenols such as bisphenol A, bisphenol F, bisphenol S, hydroquinone, catechol, resorcinol and pyrogallol, phenol-novolak resin; polyhydric alcohols such as trimethylol propane; amine compounds such as piperazine, aniline, and cyclohexylamine; polybasic carboxylic acids such as adipic acid, phthalic acid and 3,9-bis(2-carboxyethyl)-2,4,8,10-tetroxaspiro[5,5]-undecane; polythiols such as 1,2-dimercaptoethane and 2-mercaptoethylether; hydrazides such as phenylacetic acid hydrazide; amino acids such as alanine and valine; compounds having two or more of different functional groups in the molecule such as 2-mercaptoethanol, 1-mercapto-3-phenoxy-2-propanol, mercaptoacetic acid, N-methylethanolamine, diethanolamine, hydroxyaniline, N-methyl-o-aminobenzoic acid, anthranilic acid and lactic acid.

To produce an addition compound which is the latent curing agent of this invention, components (a) and (b) are reacted in a ratio of 0.8 to 2.5 equivalent, preferably 0.9 to 1.5 equivalent of epoxy group in component (a) for 1 equivalent of active hydrogen in component (b). If the epoxy group is less than 0.8 equivalent for 1 equivalent of active hydrogen, the resulting addition product has a low softening point and cannot be readily crushed. Epoxy resins incorporated with such an addition product is poor in storage stability.

If the epoxy group is used in excess of 2.5 equivalent for 1 equivalent of active hydrogen, the resulting addition product will be an insoluble solid with partial three-dimensional networks. Epoxy resins incorporated with such an addition product are slow in curing and the cured product is uneven.

In the case where the latent curing agent is produced from components (a), (b) and (c), the molar ratio of (c) to (b) should be 0.2:1 to 1:1 If component (c) is used in excess of equimolar amount, the resulting latent curing agent is poor in curing performance. Components (a), (b) and (c) should be reacted in a ratio of 0.8 to 2.5 equivalent, preferably 0.9 to 1.5 equivalent of epoxy group in component (a) for 1 equivalent of the total active hydrogen in components (b) and (c), for the reasons mentioned above for the components (a) and (b).

The addition product preferable as the latent curing agent of this invention should have active hydrogen and epoxy group in the above-mentioned ratio, and have a softening point of 60° to 180° C. If the softening point is lower than 60° C., the latent curing agent is poor in storage stability at room temperature; and if it is higher than 180° C., the latent curing agent is poor in curing performance.

Two or more compounds may be mixed for each of components (a), (b), and (c), so long as the active hydrogen and epoxy group are used in quantities as specified above. It is possible to obtain an addition product having a desired softening point by changing the kind and mixing ratio of the compounds of each component.

The latent curing agent of this invention can be easily obtained by thoroughly mixing components (a) and (b), or components (a), (b), and (c), gelling them at room temperature, reacting at 80° to 150° C., cooling, solidifying, and crushing. It can also be prepared by performing addition reaction in a solvent such as tetrahydrofuran, dioxane, and methyl ethyl ketone, removing the solvent, and crushing the solid.

The latent curing agent of this invention can be used in combination with a known curing agent such as acid anhydride, dicyandiamide, dibasic acid hydrazide, guanamine, and melamine. The combined use with dicyandiamide greatly improves the curing performance without the sacrifice of storage stability. The latent curing agent of this invention can be applied to a variety of known epoxy resins having two or more epoxy groups in one molecule. The latent curing agent of this invention should be used in an amount of 0.5 to 50 parts by weight for 100 parts by weight of epoxy resin. If the quantity is less than 0.5 part by weight, satisfactory curing performance is not attained; and using more than 50 parts by weight impairs the performance of the cured product.

The representative examples of epoxy resins to be applied to the latent curing agent of the invention are those based on glycidyl ethers of polyhydric phenols such as 2,2-bis(4-hydroxyphenyl)-propane (Bisphenol A), resorcinol, hydroquinone, pyrocatechol, saligenin, glycidyl ether or Bisphenol F and glycidyl ether of phenolformaldehyde resin.

If necessary, other curing agents, cure accelerator and fillers may be employed in combination with the curing agent of the present invention.

The following examples illustrate the preparation of the latent curing agents and their use as a curing agent for epoxy resin. The abbreviation of raw material employed in the examples are as follows.

(a) Polyfunctional epoxide
Epon 828 (a product of Shell Chemical Co.) Bisphenol A type epoxy resin epoxy equivalent 185~190
Epon 834 (a product of Shell Chemical Co.) Bisphenol A type epoxy resin epoxy equivalent 245~260
Epon 1001 (a product of Shell Chemical Co.) Bisphenol A type epoxy resin epoxy equivalent 460~480
Epiclon 830 (a product of Dainippon Ink & Chemicals Co.) Bisphenol F type epoxy resin epoxy equivalent 170~190

(b) Organic compounds having at least one functional group of OH group, SH group, COOH group and CONHNH$_2$ group together with tertiary amino group in the molecule DMAE: 2-Dimethylaminoethanol
DMP-30: 2,4,6-Tris(dimethylaminomethyl)phenol
DMP-10: 2-(Dimethylaminomethyl)phenol
PG-MZ: 1-(2-Hydroxy-3-phenoxypropyl)-2-methylimidazole
PG-EMZ: 1-(2-Hydroxy-3-phenoxypropyl)-2-ethyl-4-methylimidazole
PG-PZL: 1-(2-Hydroxy-3-phenoxypropyl)-2-phenylimidazoline
DEAE: 2-Diethylaminoethanol
DMAPA: 2-Dimethylamino-iso-propanol
BG-MZ: 1-(2-Hydroxy-3-butoxypropyl)-2-methylimidazole
SMZ: 2-Mercapto-1-methylimidazole
DMLL: N$^\alpha$,N$^\alpha$-Dimethyl-N$^\epsilon$-lauroyllysine
DMPH: N,N-Dimethyl-$\beta$-aminopropionic hydrazide
DMGH: N,N-Dimethylglycine hydrazide
2SPy: 2-Mercaptopyridine
4SPy: 4-Mercaptopyridine (c) Organic compounds having two or more of the active hydrogen atoms in the molecule BA: Bisphenol A
HQ: Hydroquinone
TMP: Trimethylolpropane
CATU: 3,9-Bis(2-carboxyethyl)-2,4,8,10-tetroxaspiro[5,5]undecane
DME: 1,2-Dimercaptoethane
PG-SH: 1-Mercapto-3-phenoxy-2-propanol
PAAH: Phenylacetylhydrazine
p-HBA: p-Hydroxybenzoic acid

EXAMPLE 1

Preparation of addition product of DMAE and Epon 828

33.44 Grams (0.176 equivalent) of Epon 828 was sufficiently mixed with 9.0 g (0.1 equivalent) of DMAE at room temperature, and the temperature was raised gradually under stirring. The reaction proceeded rapidly when the temperature reached to around 70° C. After heating at 100° C. for about 1 hour, the reaction mixture was cooled to room temperature whereby pale yellowish solid was obtained. This product had a softening temperature of 100° C. and was referred to as sample No. 1.

EXAMPLE 2

Preparation of addition product of PG-MZ, BA and Epon 828

11.6 Grams (0.05 equivalent) of PG-MZ, 5.7 g (0.05 equivalent) of BA and 50 ml of methyl ethyl ketone as solvent were mixed in a 200 ml three-necked flask equipped with a condenser and a stirrer. To the mixture under stirring was added dropwise 19 g (0.1 equivalent) of Epon 828 dissolved in 30 ml of methyl ethyl ketone over a period of 30 minutes while the temperature was maintained to 80° C. Then the mixture was refluxed for 2 hours under stirring. The reaction mixture was concentrated under reduced pressure to remove methyl ethyl ketone and cooled to room temperature whereby pale yellowish solid was obtained. The product had a softening temperature of 140° C. and referred to as sample No. 13.

The sample No. and softening temperature of other addition product prepared by similar manner as in Examples are shown in the following Table.

| Sample No. | (a) Component (Numbers of equivalent) | (b) Component (Numbers of equivalent) | (c) Component (Numbers of equivalent) | a/b+c (Equivalent ratio) | Softening temperature (°C.) |
| --- | --- | --- | --- | --- | --- |
| 1 | Epon 828 (1.75) | DMAE (1.0) | — | 1.75 | 100 |
| 2 | Epon 828 (2.0) | DMP-30 (1.0) | — | 2.0 | 180 |
| 3 | Epon 828 (2.0) | DMP-10 (1.2) | — | 1.67 | 180 |
| 4 | Epon 834 (1.4) | PG-MZ (1.0) | — | 1.40 | 140 |
| 5 | Epon 828 (1.4) | PG-MZ (1.0) | — | 1.40 | 140 |
| 6 | Epon 828 (1.75) | PG-PZL (1.0) | — | 1.75 | 100 |
| 7 | Epon 828 (2.0) | SMZ (1.5) | — | 1.33 | 80 |
| 8 | Epon 828 (2.0) | 4SPy (1.5) | — | 1.33 | 180 |
| 9 | Epon 828 (2.0) | nicotinic acid (1.5) | — | 1.33 | 180 |
| 10 | Epon 828 (2.0) | DMLL (1.0) | — | 2.0 | 80 |
| 11 | Epon 828 (2.0) | DMPH (1.5) | — | 1.33 | 180 |
| 12 | Epon 828 (2.0) | DMP-30 (1.0) | BA (1.0) | 1.0 | 120 |
| 13 | Epon 834 (2.0) | DMP-30 (1.0) | BA (1.0) | 1.0 | 180 |
| 14 | Epon 1001 (2.0) | DMP-30 (1.0) | BA (1.0) | 1.0 | 180 |
| 15 | Epon 828 (2.0) | DMP-10 (1.0) | BA (1.0) | 1.0 | 80 |
| 16 | Epon 828 (2.0) | DMAE (1.0) | BA (1.0) | 1.0 | 160 |
| 17 | Epon 834 | PG-MZ | BA | 1.0 | 140 |

-continued

| Sample No. | (a) Component (Numbers of equivalent) | (b) Component (Numbers of equivalent) | (c) Component (Numbers of equivalent) | a/b+c (Equivalent ratio) | Softening temperature (°C.) |
|---|---|---|---|---|---|
| | (2.0) | (1.0) | (1.0) | | |
| 18 | Epon 828 (2.0) | PG-MZ (1.0) | BA (1.0) | 1.0 | 140 |
| 19 | Epon 828 (2.0) | PG-EMZ (1.0) | BA (1.0) | 1.0 | 100 |
| 20 | Epon 828 (2.0) | PG-PZL (1.0) | BA (1.0) | 1.0 | 80 |
| 21 | Epon 834 (2.0) | PG-MZ (1.0) DMP-30 (0.2) | BA (1.0) | 0.91 | 100 |
| 22 | Epon 828 (0.2) | PG-MZ (1.0) DMP-30 (0.13) | BA (1.0) | 0.94 | 120 |
| 23 | Epiclon 830 (2.0) | PG-MZ (1.0) DMP-30 (0.2) | BA (1.0) | 0.91 | 100 |
| 24 | Epon 828 (2.0) | PG-MZ (1.0) DMP-30 (0.2) | HQ (1.0) | 0.91 | 100 |
| 25 | Epon 828 (2.0) | PG-EMZ (1.0) | HQ (1.2) | 0.91 | 120 |
| 26 | Epon 1001 (2.0) | DMAE (1.0) DMP-30 (0.2) | BA (1.0) | 0.91 | 180 |
| 27 | Epon 828 (2.0) | DMAE (1.0) DMP-30 (0.2) | BA (1.0) | 0.91 | 120 |
| 28 | Epon 828 (2.0) | PG-PZL (1.0) DMP-30 (0.13) | BA (1.0) | 0.93 | 80 |
| 29 | Epon 828 (2.0) | PG-EMZ (1.0) DMP-30 (0.2) | BA (1.0) | 0.91 | 100 |
| 30 | Epon 828 (2.0) | DEAE (1.0) DMP-30 (0.2) | BA (1.0) | 0.91 | 160 |
| 31 | Epon 828 (2.0) | DMAPA (1.4) | BA (0.6) | 1.0 | 160 |
| 32 | Epon 828 (2.0) | BG-MZ (1.0) DMP-30 (0.2) | BA (1.0) | 0.91 | 100 |
| 33 | Epon 828 (2.0) | PG-MZ (1.0) DMP-30 (0.2) | pyrogallol (1.0) | 0.91 | 140 |
| 34 | Epon 828 (2.0) | SMZ (0.5) DMP-10 (0.5) | BA (1.0) | 1.0 | 120 |
| 35 | Epon 828 (2.0) | DMLL (1.0) | BA (1.0) | 1.0 | 160 |
| 36 | Epon 828 (2.0) | DMPH (1.0) | BA (1.0) | 1.0 | 140 |
| 37 | Epon 828 (2.0) | DMGH (1.0) | BA (1.0) | 1.0 | 120 |
| 38 | Epon 828 (2.0) | nicotinic acid (1.0) | BA (1.0) | 1.0 | 150 |
| 39 | Epon 828 (2.0) | 2SPy (1.0) | BA (1.0) | 1.0 | 80 |
| 40 | Epon 828 (2.0) | DMP-10 (1.0) | piperazine (1.0) | 1.0 | 100 |
| 41 | Epon 828 (2.0) | DMP-10 (1.0) | aniline (1.0) | 1.0 | 100 |
| 42 | Epon 828 (2.0) | PG-MZ (1.0) DMP-30 (0.2) | TMP (1.0) | 0.91 | 100 |
| 43 | Epon 828 | DMP-10 | adipic acid | 1.0 | 90 |

-continued

| Sample No. | (a) Component (Numbers of equivalent) | (b) Component (Numbers of equivalent) | (c) Component (Numbers of equivalent) | a/b+c (Equivalent ratio) | Softening temperature (°C.) |
|---|---|---|---|---|---|
| 44 | Epon 828 (2.0) | DMP-10 (1.0) | CATU (1.0) | 1.0 | 110 |
| 45 | Epon 828 (2.0) | PD-MZ (1.0) | DME (1.0) | 1.0 | 100 |
| 46 | Epon 828 (2.0) | DMP-10 (1.0) | DME (1.0) | 1.0 | 80 |
| 47 | Epon 828 (2.0) | PG-MZ (1.0) | PG-SH (1.0) | 1.0 | 100 |
| 48 | Epon 828 (2.0) | DMP-10 (1.0) | PG-SH (1.0) | 1.0 | 100 |
| 49 | Epon 828 (2.0) | DMP-10 (1.0) | PAAH (1.0) | 1.0 | 90 |
| 50 | Epon 828 (2.0) | DMP-10 (1.0) | diethanolamine (1.0) | 1.0 | 80 |
| 51 | Epon 828 (2.0) | DMP-10 (1.0) | L-alanine (1.0) | 1.0 | 120 |
| 52 | Epon 828 (2.0) | DMP-10 (1.0) | p-HBA (1.0) | 1.0 | 140 |
| 53 | Epon 828 (2.0) | DMP-10 (1.0) | anthranilic acid (1.0) | 1.0 | 120 |
| 54 | Epon 828 (2.0) | DMP-10 (1.0) | lactic acid (1.0) | 1.0 | 80 |

EXAMPLE 3

Reactivity, storage stability and glass transition temperature of the formulated epoxy resin composition were evaluated.

1. Preparation of the sample

The formulation of the sample is shown in Table 1. The sample was stirred for 1 hour with defoaming under the reduced pressure by using the mixing and grinding machine.

2. Evaluation of the reactivity (1) Onset temperature (Ti) and peak temperature (Tp) were measured by differential thermal analysis (DTA)

Sample weight: about 10 mg
Standard material: α-Al₂O₃
Heating rate: 5° C./min.

(2) The sample was put into the Geer's oven maintained to the prescribed temperature and the resulted cure resin was observed on its appearance.

3. Storage stability

The sample was put into the Geer's oven set to 30° C. and the day required for the sample becoming non-fluidity was measured.

4. Glass transition temperature (Tg)

Tg of the cured resin was measured with a thermal mechanical analysis apparatus (TMA, a product of Rigaku Corporation) by TMA penetration method.

Raising rate of temperature: 10° C./min.
Load: 10 g
Diameter of needle: 1 mm

The results obtained are summarized in Table 2.

TABLE 1

| Formulation | |
|---|---|
| Epon 828 | 100 parts by weight |
| Latent curing agent of the present invention | 20 |
| ZnO | 3 |
| TiO₂ | 2 |

As shown in Table 2, the addition product of the present invention is superior latent curing agent because it showed greatly improved storage stability in comparison with compound having an active hydrogen atom and tertiary amino group (control) alone.

TABLE 2

| | Sample No. | Reactivity | | | Storage stability at 30° C. | Glass*1 transition point (°C.) |
|---|---|---|---|---|---|---|
| | | Ti (°C.) | Tp (°C.) | Curing temp. and time | | |
| Example | 5 | 90 | 135 | 120° C.  60 min. | >1 month | 86(a) |
| | 11 | 116 | 140 | ″        ″ | ″ | 83(a) |
| | 16 | 93 | 126 | ″        ″ | ″ | 84(a) |
| | 17 | 89 | 128 | ″        ″ | ″ | 80(a) |
| | 19 | 94 | 162 | ″        ″ | ″ | 82(a) |
| | 21 | 84 | 123 | ″        ″ | ″ | 80(a) |
| | 22 | 82 | 130 | ″        ″ | ″ | 82(a) |
| | 24 | 80 | 125 | ″        ″ | ″ | 78(a) |
| | 32 | 85 | 130 | ″        ″ | ″ | 86(a) |
| | 40 | 82 | 120 | ″        ″ | ″ | 88(b) |
| | 42 | 92 | 125 | ″        ″ | ″ | 80(b) |
| | 43 | 92 | 130 | 100°     30 | ″ | 78(b) |
| | 44 | 95 | 130 | ″        ″ | ″ | 80(b) |
| | 45 | 96 | 119 | ″        ″ | ″ | 123(b) |
| | 47 | 97 | 128 | ″        ″ | ″ | 77(b) |
| | 48 | 96 | 120 | ″        ″ | ″ | 82(b) |
| | 49 | 90 | 125 | ″        ″ | ″ | 85(b) |
| | 50 | 86 | 113 | ″        60 | ″ | 77(b) |

TABLE 2-continued

|  | Sample No. | Reactivity Ti (°C.) | Tp (°C.) | Curing temp. and time | | Storage stability at 30° C. | Glass*1 transition point (°C.) |
|---|---|---|---|---|---|---|---|
|  | 51 | 80 | 122 | " | " | " | 89(a) |
|  | 52 | 115 | 160 | 120° | 60 | " | 73(a) |
|  | 53 | 103 | 142 | 120° | 60 | " | 76(a) |
|  | 54 | 103 | 134 | 100° | 60 | " | 83(a) |
|  | DMP-30 | 60 | 110 | 100°C. | 30 min. | <1 day | 125(b) |
|  | DMAE | 55 | 101 | " | " | " | 117(b) |
|  | DEAE | 60 | 100 | " | " | " | 110(b) |
| Control (5phr) | PG-MZ | 60 | 120 | " | " | " | 131(b) |
|  | DMLL | 107 | 129 | " | 60 | 1 week | 60(a) |
|  | DMPH | 62 | 83 | " | 5 | <1 day | 127(b) |

*1Curing condition
(a) 120° C., 60 min.
(b) 100° C., 60 min.

EXAMPLE 4

Reactivity and storage stability of the combination system of the latent curing agent of the present invention and diabasic acid hydrazide were estimated.

The formulation is shown in Table 3 and the results are shown in Table 4.

TABLE 3

| Formulation | |
|---|---|
| Epon 828 | 100 parts by weight |
| Latent curing agent of the present invention | 20 |
| Adipic dihydrazide | 8 |
| ZnO | 5 |

It will be understood from the comparison of Table 2 with Table 4 that the latent curing agent of the present invention exerts synergistic effect in reactivity in combination with adipic dihydrazide.

TABLE 4

| Sample No. | Reactivity Ti (°C.) | Tp (°C.) | Curing temp. | time | Storage stability at 30° C. | Glass*2 transition temperature (°C.) |
|---|---|---|---|---|---|---|
| 1 | 90 | 146 | 110° C. | 60 min. | >1 month | 95(a) |
| 2 | 103 | 154 | 150 | 15 | " | 103(c) |
| 3 | 82 | 136 | 100 | 30 | " | 114(a) |
| 4 | 95 | 127 | " | " | " | 109(a) |
| 5 | 93 | 134 | " | " | " | 104(a) |
| 6 | 144 | 170 | 150 | 20 | " | 93(c) |
| 7 | 142 | 158 | 140 | 60 | " | 76(c) |
| 8 | 122 | 142 | 120 | 60 | " | 152(c) |
| 9 | 139 | 152 | 120 | 30 | " | 80(c) |
| 10 | 111 | 141 | 100 | 60 | " | 93(b) |
| 11 | 136 | 160 | 140 | 15 | " | 122(c) |
| 12 | 126 | 154 | 100 | 30 | " | 101(a) |
| 13 | 102 | 150 | " | " | " | 110(a) |
| 14 | 87 | 134 | " | " | " | 122(a) |
| 15 | 86 | 131 | " | " | " | 102(a) |
| 16 | 95 | 127 | " | " | " | 102(a) |
| 17 | 96 | 126 | " | " | " | 104(a) |
| 18 | 98 | 130 | " | " | " | 101(a) |
| 19 | 92 | 125 | " | " | " | 122(a) |
| 20 | 138 | 170 | 150 | 30 | " | 120(c) |
| 21 | 93 | 124 | 100 | 30 | " | 110(a) |
| 22 | 97 | 122 | " | " | " | 125(a) |
| 23 | 94 | 122 | " | " | " | 120(a) |
| 24 | 87 | 126 | " | " | " | 122(a) |
| 25 | 94 | 126 | " | " | " | 113(a) |
| 26 | 88 | 125 | " | " | " | 107(a) |
| 27 | 82 | 136 | 100 | 60 | " | 106(a) |
| 28 | 86 | 152 | " | " | " | 67(a) |
| 29 | 87 | 124 | 100 | 30 | " | 100(a) |
| 30 | 98 | 134 | 100 | 60 | 3 weeks | 115(a) |
| 31 | 83 | 124 | 100° C. | 30 min. | 2 weeks | 115(a) |
| 32 | 86 | 120 | 100 | 30 | >1 month | 127(a) |
| 33 | 82 | 144 | " | " | " | 110(a) |
| 34 | 109 | 138 | 100 | 60 | " | 104(a) |
| 35 | 105 | 139 | 100 | 60 | " | 103(a) |
| 36 | 113 | 140 | 100 | 30 | " | 102(a) |
| 37 | 119 | 151 | 120 | 20 | " | 127(b) |
| 38 | 123 | 149 | 120 | 60 | " | 115(b) |
| 39 | 128 | 150 | 140 | 60 | " | 99(c) |
| 40 | 100 | 128 | 100 | 30 | " | 119(a) |
| 41 | 99 | 127 | 80 | 60 | " | 101(a) |

TABLE 4-continued

| Sample No. | Reactivity Ti (°C.) | Tp (°C.) | Curing temp. | time | Storage stability at 30° C. | Glass*2 transition temperature (°C.) |
|---|---|---|---|---|---|---|
| 42 | 91 | 130 | 100 | 30 | " | 100(a) |
| 43 | 89 | 128 | " | " | " | 110(a) |
| 44 | 95 | 129 | " | " | " | 112(a) |
| 45 | 100 | 127 | 80 | 60 | " | 128(a) |
| 46 | 105 | 129 | 100 | 30 | " | 107(a) |
| 47 | 97 | 128 | 100 | 10 | " | 130(a) |
| 48 | 100 | 126 | 100 | 30 | " | 109(a) |
| 49 | 95 | 129 | 100 | 60 | " | 98(a) |
| 50 | 92 | 120 | 100 | 20 | " | 113(a) |
| 51 | 94 | 125 | " | " | " | 113(a) |
| 52 | 119 | 138 | 120 | 10 | " | 123(b) |
| 53 | 108 | 128 | 100 | 60 | " | 123(b) |
| 54 | 107 | 132 | " | " | " | 121(a) |

*2Curing condition
(a) 100° C., 60 min.
(b) 120° C., 60 min.
(c) 150° C., 60 min.

EXAMPLE 5

The storage stability and curing of the combination system of the latent curing agent of the present invention and the known latent curing agent were estimated. The formulation and the result are shown in Table 5.

As shown in Table 5, the epoxy system containing the known latent curing agent alone did not entirely cure at 100° C. for 1 hour. However, the combination system of the latent curing agent and the known latent curing agent caused complete curing at 100° C.

TABLE 5

|  | Example |  |  | Control |  |  |
|---|---|---|---|---|---|---|
| Epon 828 | 100 parts | 100 | 100 | 100 | 100 | 100 |
| Sample No. 24 | 15 | 15 | 15 | — | — | — |
| Known dicyandiamide | 8 |  |  | 8 |  |  |
| latent  melamine |  | 8 |  |  | 8 |  |
| curing  benzoguanamine |  |  | 8 |  |  | 8 |
| agent |  |  |  |  |  |  |
| Storage stability (30° C.) | >3 months | >3 months | >3 months | >3 months | >3 months | >3 months |
| Reactivity at 100° C., 1 hour | cured | cured | cured | not cured | not cured | not cured |

EXAMPLE 6

The reactivity and the storage stability of the combination system of the latent curing agent and acid anhydride were estimated. The formulation is shown in Table 6 and the results are shown in Table 7.

TABLE 6

| Epon 828 | 100 parts by weight |
|---|---|
| Methylhexahydrophthalic anhydride | 85 |
| Latent curing agent of the present invention | 5 |

TABLE 7

| Sample No. | Reactivity Ti (°C.) | Tp (°C.) | Curing temp. and time | Storage stability (30° C.) |
|---|---|---|---|---|
| 3 | 122 | 149 | 120° C., 60 min. | 3 weeks |
| 16 | 109 | 146 | 100° C., 60 min. | 2 weeks |
| 40 | 118 | 146 | 120° C., 60 min. | 2 weeks |
| 43 | 110 | 145 | 120° C., 60 min. | 1 weeks |
| 46 | 113 | 159 | 120° C., 60 min. | 2 weeks |

What is claimed is:

1. A latent curing agent for epoxy resins which comprises an addition product obtained by reacting (a) a polyfunctional epoxy compound and (b) a compound having at least one functional group of OH group, SH group and CONHNH$_2$ group together with a tertiary amino group in the molecule in a ratio of 0.8 to 2.5 equivalent of epoxy group in compound (a) for 1 equivalent of active hydrogen in compound (b), said addition product having a softening point of 60° to 180° C.

2. The latent curing agent of claim 1, wherein said polyfunctional epoxy compound is polyglycidyl ether of polyhydric phenol.

3. The latent curing agent of claim 1, wherein said compound (b) is one represented by the general formula

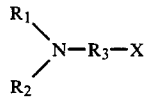

wherein X is —OH group, —SH group or —CONHNH$_2$ group, R$_1$ and R$_2$ are each C$_1$–C$_{20}$ alkyl groups, C$_2$–C$_{20}$ alkenyl groups or aralkyl groups, with or without substituent such as oxygen, halogen, and functional group as represented by X mentioned above, and may be connected with each other to form a ring, and R$_3$ is a divalent residue of R$_1$ or R$_2$, and R$_1$, R$_2$ and R$_3$ may connect with one another to form a ring.

4. A latent curing agent for epoxy resins which comprises an addition compound obtained by reacting (a) a polyfunctional epoxy compound, (b) a compound having at least one functional group of OH group, SH group, COOH group and CONHNH$_2$ group together with a tertiary amino group in the molecule, and (c) an organic compound having two or more active hydrogen atoms in the molecule (excluding a compound having an epoxy group or tertiary amino group) in a ratio of 0.8 to 2.5 equivalent in component (a) for 1 equivalent of the total active hydrogen in components (b) and (c), the molar ratio of (c) to (b) being 0.2:1 to 1:1, and said addition product having a softening point of 60° to 180° C.

5. A curable epoxy resin composition comprising (1) an epoxy resin having an average of more than one epoxy group per molecule and (2) an addition product obtained by reacting (a) a polyfunctional epoxy compound and (b) a compound having at least one functional group of OH group, SH group, COOH group and CONHNH$_2$ group together with a tertiary amino group in the molecule in a ratio of 0.8 to 2.5 equivalent of epoxy group in compound (a) for 1 equivalent of active hydrogen in compound (b), said addition product having a softening point of 60° to 180° C.

6. A curable epoxy resin composition comprising (1) an epoxy resin having an average of more than one epoxy group per molecule and (2) an addition compound obtained by reacting (a) a polyfunctional epoxy compound, (b) a compound having at least one functional group of OH group, SH group, COOH group and CONHNH$_2$ group together with a tertiary amino group in the molecule, and (c) an organic compound having two or more active hydrogen atoms in the molecule (excluding a compound having an epoxy group or tertiary amino group) in a ratio of 0.8 to 2.5 equivalent in component (a) for 1 equivalent of the total active hydrogen in components (b) and (c), the molar ratio of (c) to (b) being 0.2:1 to 1:1, and said addition product having a softening point of 60° to 180° C.

7. A cured epoxy resin composition comprising (1) an epoxy resin having an average of more than one epoxy group per molecule and (2) an addition product obtained by reacting (a) a polyfunctional epoxy compound and (b) a compound having at least one functional group of OH group, SH group, COOH group and CONHNH$_2$ group together with a tertiary amino group in the molecule in a ratio of 0.8 to 2.5 equivalent of epoxy group in compound (a) for 1 equivalent of active hydrogen in compound (b), said addition product having a softening point of 60° to 180° C.

8. A cured epoxy resin composition comprising (1) an epoxy resin having an average of more than one epoxy group per molecule and (2) an addition compound obtained by reacting (a) a polyfunctional epoxy compound, (b) a compound having at least one functional group of OH group, SH group, COOH group and CONHNH$_2$ group together with a tertiary amino group in the molecule, and (c) an organic compound having two or more active hydrogen atoms in the molecule (excluding a compound having an epoxy group or tertiary amino group) in a ratio of 0.8 to 2.5 equivalent in component (a) for 1 equivalent of the total active hydrogen in components (b) and (c), the molar ratio of (c) to (b) being 0.2:1 to 1:1, and said addition product having a softening point of 60° to 180° C.

9. The latent curing agent of claim 3 wherein said tertiary amino compound is selected from the group consisting of 2-dimethylaminoethanol, 1-methyl-2-dimethylaminoethanol, 1-phenoxymethyl-2-dimethylaminoethanol, 2-diethylaminoethanol and 1-butoxymethyl-2-dimethylaminoethanol.

10. The latent curing agent of claim 3 wherein said tertiary amino compound is selected from the group consisting of 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline and 1-(2-hydroxy-3-butoxypropyl)-2-methylimidazoline.

11. The latent curing agent of claim 3 wherein said tertiary amino compound is selected from the group consisting of 2-(dimethylaminomethyl)phenol and 2,4,6-tris(dimethylaminomethyl)phenol.

12. The latent curing agent of claim 3 wherein said tertiary amino compound is selected from the group consisting of 2-dimethylaminoethanethiol.

13. The latent curing agent of claim 3 wherein said tertiary amino compound is selected from the group consisting of N-β-hydroxyethylmorpholine, 1-methyl-2-mercaptoimidazole 2-mercaptopyridine and 4-mercaptopyridine.

14. The latent curing agent of claim 3 wherein said tertiary amino compound is selected from the group consisting of dimethylglycine and $N^\alpha,N^\alpha$-dimethyl-$N^\epsilon$-lauroyllysine.

15. The latent curing agent of claim 3 wherein said tertiary amino compound is selected from the group consisting of N,N-dimethylaminobenzoic acid, nicotinic acid, isonicotinic acid and picolinic acid.

16. The latent curing agent of claim 3 wherein said tertiary amino compound is selected from the group consisting of N,N-dimethylglycinehydrazide, N,N-dimethylpropionic acid hydrazide, nicotinic acid hydrazide and isonicotinic acid hydrazide.

* * * * *